United States Patent [19]
Sammann

[11] 3,710,564

[45] Jan. 16, 1973

[54] APPARATUS FOR PULLING TASSELS OUT OF CORN STALKS

[76] Inventor: Albert L. Sammann, Route 3, Plinview, Tex. 79072

[22] Filed: Feb. 16, 1971

[21] Appl. No.: 115,543

[52] U.S. Cl. ........................................56/51, 171/58
[51] Int. Cl. ..............................................A01d 45/02
[58] Field of Search....56/51, 6 P, 13.3, DIG. 1, DIG. 8; 171/58, 59, 60; 130/30 K, 30 P

[56] References Cited

UNITED STATES PATENTS

| 2,958,174 | 11/1960 | Lawson | 171/58 |
| 861,376 | 7/1907 | Lussier | 171/58 |
| 2,163,849 | 6/1939 | Pfister | 56/51 |

FOREIGN PATENTS OR APPLICATIONS

| 938,607 | 4/1948 | France | 171/58 |
| 1,022,599 | 12/1952 | France | 171/60 |

*Primary Examiner*—Antonio F. Guida
*Attorney*—Wayland D. Keith

[57] ABSTRACT

A self-propelled machine for movement along corn rows to pull the corn tassel therefrom to prevent pollinization, wherein a reel moves along a corn row or rows, which reel is compartmented, the periphery of which rotates at approximately the same linear speed of the machine as it travels over the ground, so corn tassels will be moved into a compartment to the reel and grasped between a facing, between two of the compartments of the reel, and a flexible elastomer belt so as the reel continues to rotate, the tassel is pulled from the stalk so as to disjoint the tassel from the stalk and carry the tassel, within the compartment of the reel, to discharge the tassel forwardly by a blast of air directed into the compartments of the reel when the compartments have moved to a position above a horizontal plane passing medially through the axis of the reel. Provision is made to discharge the air from the compartments of the reel downwardly so that the leaves of the corn stalk will be blown downward leaving the corn tassel, which moves into the compartments, free of leaves, thereby enabling the pulling of the corn tassel therefrom. Further provision is made to regulate the height of the reel as well as the attitude of the reel with respect to the terrain. The apparatus is provided with a power drive system for driving the drive wheels for movement over the terrain. A steering system is provided for steering the device. Further provisions are made for tensioning the flexible belt with respect to the compartmented reel to insure the proper gripping action on the tassels.

16 Claims, 15 Drawing Figures

FIG. 1

INVENTOR.
ALBERT L. SAMMANN
BY
Wayland D. Keith
HIS AGENT

PATENTED JAN 16 1973 3,710,564

INVENTOR.
ALBERT L. SAMMANN
BY
Wayland D. Keith
HIS AGENT

INVENTOR.
ALBERT L. SAMMANN
BY
Wayland D. Keith
HIS AGENT

PATENTED JAN 16 1973
3,710,564

INVENTOR.
ALBERT L. SAMMANN
BY
Wayland D. Keith
HIS AGENT

INVENTOR.
ALBERT L. SAMMANN
BY
Wayland D. Keith
HIS AGENT

APPARATUS FOR PULLING TASSELS OUT OF CORN STALKS

BACKGROUND OF THE INVENTION

The present invention relates to improvements in agricultural implements and more particularly to an agricultural implement for pulling tassels from corn stalks to prevent pollinization.

It is desirable to remove tassels from the male portion of the corn to prevent pollinization. Heretofore, as far as known, this has been a job which required hand labor, which was time consuming and very expensive and made the cost of seed corn unreasonably high.

It is difficult to provide an effective self-propelled machine which will effectively remove, by pulling, the tassels from corn stalks without damaging the corn or the upper leaves that normally surround the tassels. It is desirable to have an apparatus or machine that may be moved over the corn, when it has reached its normal maturity height, without damaging the corn as the tassels are being pulled therefrom.

PRIOR ART

The following prior art patents were located, considered, and the patent numbers thereof are submitted herewith:

| | | |
|---|---|---|
| 691 846 | Dominy | Jan. 28, 1902 |
| 1 054 822 | Brown | Mar. 4, 1913 |
| 1 343 884 | Hamilton | June 15, 1920 |
| 2 073 987 | Gay | Mar. 16, 1937 |
| 2 693 072 | Belzer et al. | Nov. 2, 1954 |
| 2 909 022 | Melland | Oct. 20, 1959 |
| 3 184 905 | Hillier | May 25, 1965 |

OBJECTS OF THE INVENTION

An object of the invention is to provide a self-propelled machine for removing tassels from corn stalks by pulling these out of the corn stalks as the machine moves over the terrain.

Another object of the invention is to provide a machine for pulling tassels out of corn stalks which machine will blow the leaves downward so as to prevent the leaves from being removed.

A further object of the invention is to provide a self-propelled machine for pulling tassels out of corn stalks, which machine has a compartmented reel that is adjustable to engage the tassels of corn stalks of various heights while the machine is moved over the terrain.

Still another object of the invention is to provide an air controlled system for the machine to direct air into a portion of the reel to discharge corn tassels, which have been pulled therefrom, and to blow the leaves of the corn stalks downward to enable the tassel to be removed without removing the foliage from the corn stalks.

A still further object of the invention is to provide a tensioned elastomer belt on a compartmented reel of a machine for pulling corn tassels, which reel will exert the proper pressure on the tassel to enable the tassel to be pulled from the corn stalks.

And a further object of the invention is to provide an implement which has dual power units, one for propelling the implement over the terrain, and the other, associated with the implement, for propelling the apparatus for removing the tassels from the corn.

Still another object of the invention is to provide an implement for removing the tassels from corn stalks which is simple and sturdy in construction, low in the cost of manufacture and which requires a minimum of maintenance.

SUMMARY OF THE INVENTION

A wheeled vehicle having a dual power plant thereon, one of which power plants propels the implement over the terrain and the other of which power plants operates machinery which is ancillary to the removal of tassels from corn by pulling the tassel therefrom, which implement includes a steerable wheeled frame with one or more forwardly extending, compartmented reels thereon. The reels are adjustable both for height and attitude to enable a tassel to be moved into a compartment of the compartmented reel at approximately the same linear speed of travel as the peripheral speed of travel of the compartmented reel, so that the tassel may be gripped between a facing between the compartments of the reel and a flexible elastomer belt so, as the reel rotates upwardly, the tassel will be pulled from the corn stalk, as the corn stalk passes beneath the wheeled frame.

An air system is provided so as to direct an air blast into the compartmented reel so the discharge of the air from between the blades of the compartmented reel will direct the pulled tassel outwardly, also the leaves on the corn stalk, ahead of the reel, are blown downwardly so that the leaves will not be engaged by the reel.

The wheeled frame on which the compartmented reel or reels is mounted is of such height as not to disturb or destroy the corn either before or after the tassel is pulled from the corn stalk, other than pulling the tassel therefrom. The air system and the hydraulic systems of the machine are driven by a power unit separate and independent of the power unit which propels the implement over the terrain; therefore, the speed of the various components may be regulated independently of the speed at which the device moves over the terrain.

DESCRIPTION OF THE PREFERRED EMBODIMENT

The present invention embodies a mobile wheeled frame, designated generally by the numeral 1, which has a prime mover 2 mounted thereon for propelling the mobile, wheeled frame over the terrain. The prime mover 2 may be in the form of an internal combustion engine 3 having a throttle 3A, which engine is connected in driving relation with a transmission 4, which in turn is connected with a differential gear unit 6, which differential drives drive shafts 8 and 10. Each of the drive shafts has a transmission drive member, such as the respective V-belt pulleys 12 and 14 thereon to drive to the respective transmission means, such as V-belt pulleys 16 and 18 on shaft 19, which V-belt pulleys are connected in driving relation with the respective sprockets 20 and 22, which drive the respective drive chains 24, one of which chains drives the sprockets 20 and 26, and the other chain 14 surrounds sprockets 22 and 28 to drive the respective traction wheels 30 and 32. The traction wheels 30 and 32 are journaled on the respective bearings 34 and 36, which bearings are mounted on the lower end of the frame members 38 and 40, respectively.

Figure 14:
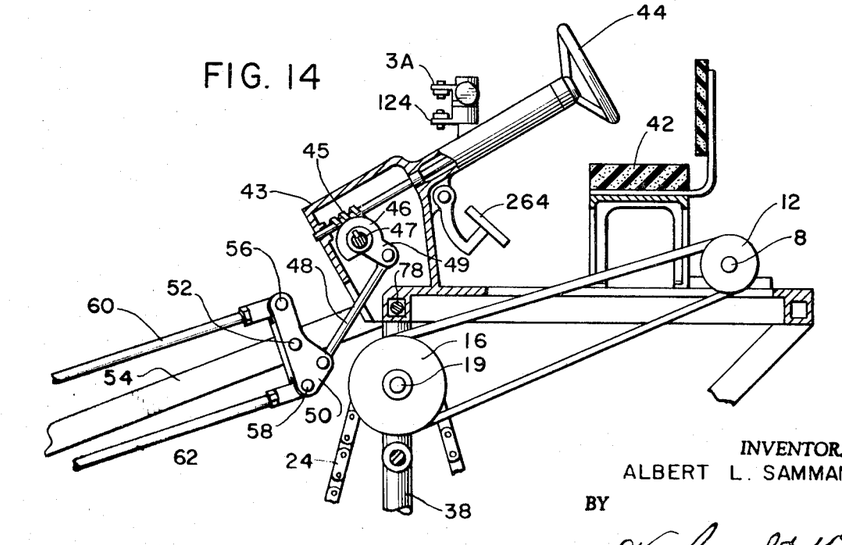
FIG. 14 is a sectional view taken on line 14—14 of FIG. 2, looking in the direction indicated by the arrows.

The particular gearing arrangement of the transmission 4, differential 6, transmission drive means 12, 16, 14 and 18, and sprocket and chain gearing arrangement 20, 24, 26 and 22, 24, 28, is such as to propel the mobile wheeled frame across a field at the proper speed to gather tassels from corn stalks in the manner hereinafter set out. The wheeled frame is driven by an operator, who utilizes a seat 42 and operates a steering wheel 44, throttles, clutches and gear shift mechanisms. The steering wheel 44 operates a worm gear arrangement 45 in housing 43, as will best be seen in FIG. 14, which worm gear 45 moves a gear segment 46 which is mounted on and secured to a shaft 47, which gear segment 46 has a crank 49 thereon to operate a pitman or connecting link 48 that is connected to a lever 50. The lever 50 is pivotally mounted on a pivot pin 52 on a frame member 54, which lever has pivot pins 56 and 58 therein to pivotally connect tension rods 60 and 62 thereto, as will best be seen in FIG. 14. These rods extend downward along frame member 54 and connect to a complementary lever 64, which lever 64 is pivoted to the frame member 54 by a pivot pin 66. The tension rod 60 is pivoted to the lever 64 by pivot pin 68 and the rod 62 is pivoted to the lever 64 by a pivot pin. One of these tension rod arrangements is positioned on each side of the wheeled frame 1, as will best be seen in FIGS. 1, 2, 8 and 14.

The shaft 47 is journaled in the worm gear housing 43, which shaft has a lever 72 fixedly secured thereto to move pitman or link 76 which pivotally connects levers 72 and 74. The lever 74 is fixedly secured to a shaft 78 which passes transversely across the wheeled frame and has a lever 80 fixedly secured to the opposite end thereof which moves a connecting link 82, which is pivotally connected thereto, to actuate a lever 84 which is pivotally connected to the opposite end of connecting link 82. The lever 84 is connected to a double acting lever 86 and is arcuately movable in unison, which double acting lever 86 is pivotally mounted on shaft 87 on frame member 88, which frame member is similar in construction to frame member 54.

Tension rods 90 and 92 are pivotally connected to double acting lever 86 and extend downwardly therefrom and are pivotally connected to a complementary double acting lever 94 pivoted at 96 on frame member 88. A rod 98 is pivotally connected to lever 94 and extends outward to a steering arm 100 mounted on the upper end of a shaft 102, which shaft is journaled in bearing 103 on frame member 88, so, upon manipulation of the steering wheel, one of the rods 90 or 92 will be in tension, therefore steering rods of minimum size may be used.

Tension rods 60 and 62 are pivotally connected to a double acting lever 64 pivotally mounted on frame member 54, which lever has a connecting rod 110 extending therefrom and pivotally connected to an outstanding steering arm 112 mounted on the upper end of shaft 114. The shaft 114 is journaled in bearing 116 mounted on the lower end of frame member 54. An out turned axle or shaft 118 is mounted on the lower end of shaft 114, which axle has a wheel 120 journaled thereon.

Figure 13:
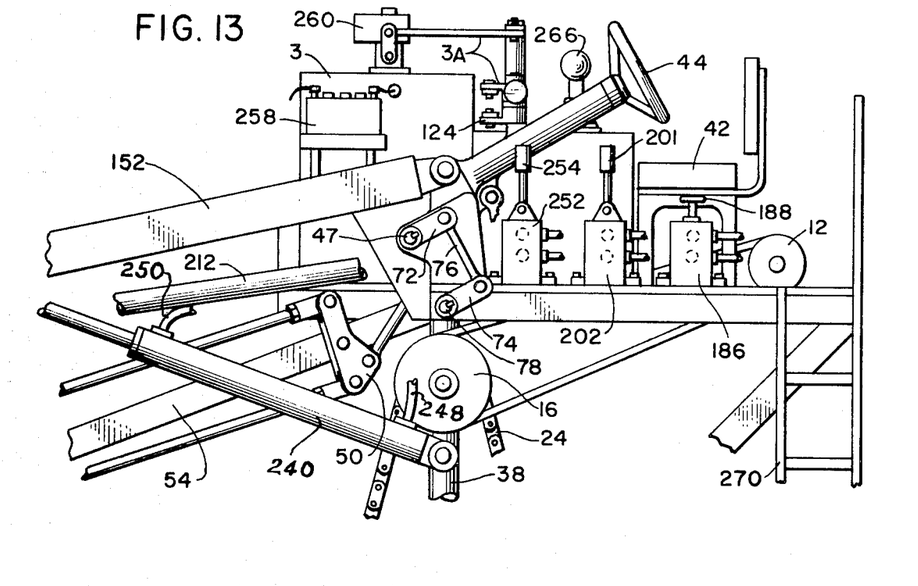
FIG. 13 is a view similar to FIG. 12 but of the opposite side of the self-propelled implement for pulling corn tassels from corn stalks, with certain parts being broken away.

Upon operation of steering wheel 44, the double acting lever 50 is moved arcuately in a direction opposite to the movement of double acting lever 86 on the opposite side of the wheeled frame 1. Due to the direct movement of connecting link 48 which is connected to the lever 50, the rods 60 and 62 will be operated to move the wheel 120 in one direction and, because of the movement of reversal linkage mechanism as shown at 72, 74 and 76 in FIG. 13, an inverse movement will be imparted to connecting link 82 with respect to connecting link 48, therefore, wheel 106, mounted on axle 104, will be moved in complementary relation to wheel 120 to enable the proper steering of the wheeled frame. In this manner the wheels 106 and 120 are used for steering, and since the frame members 54 and 88 are spaced apart at their forward ends, without transverse bracing, stalks S of the corn being detasseled may pass freely therebetween without interference from transverse bracing.

A second prime mover unit, designated by the numeral 122, is mounted on the mobile, wheeled frame 1 and is provided with a throttle mechanism, designated generally by the number 124, to regulate the speed of the prime mover 122, which prime mover is usually an internal combustion engine. A clutch 126 is provided, which clutch is operable by a lever 128 for engagement, and disengagement thereof. A gear box 130 is provided, which gear box has a transmission pulley or gearing 132 extending outward therefrom to connect with a suitable drive means, such as a belt 134, to drive a pulley 136 on counter shaft 137. One end of the counter shaft drives a blower fan 138, and a belt 140 passes around pulley 142 thereon and around pulley 144 on the shaft of pump 146 to drive the hydraulic pump 146 mounted on the mobile wheeled frame 1. The use of hydraulics and air to perform the various functions will be brought out more fully hereinafter. The prime mover 122 operates independently of the prime mover 3, which moves the wheeled frame over the terrain, therefore the speed of each prime mover may be accurately controlled for the function it is to perform.

Figure 1:
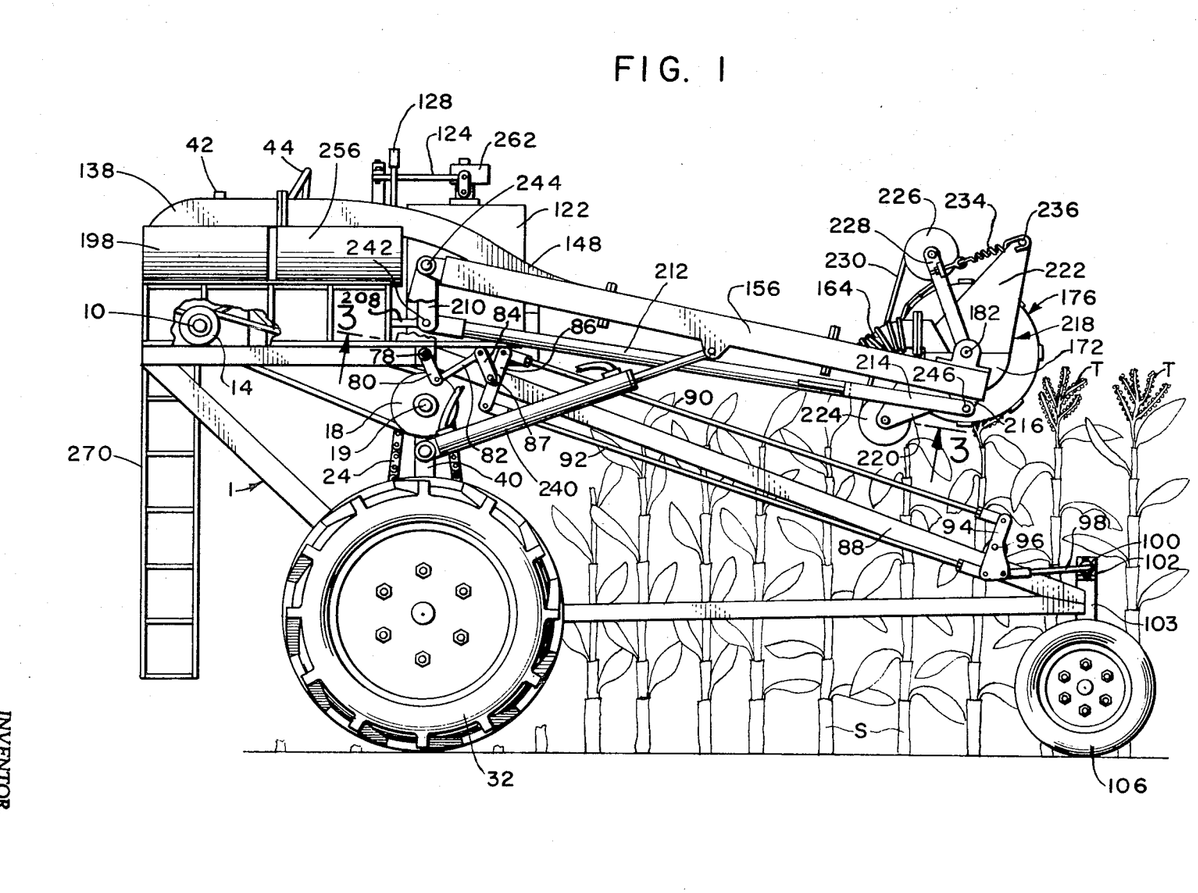
FIG. 1 is a side elevational view of the self-propelled implement for pulling tassels from a corn stalk with portions being broken away and shown in section to bring out the details of construction.
Figure 2:
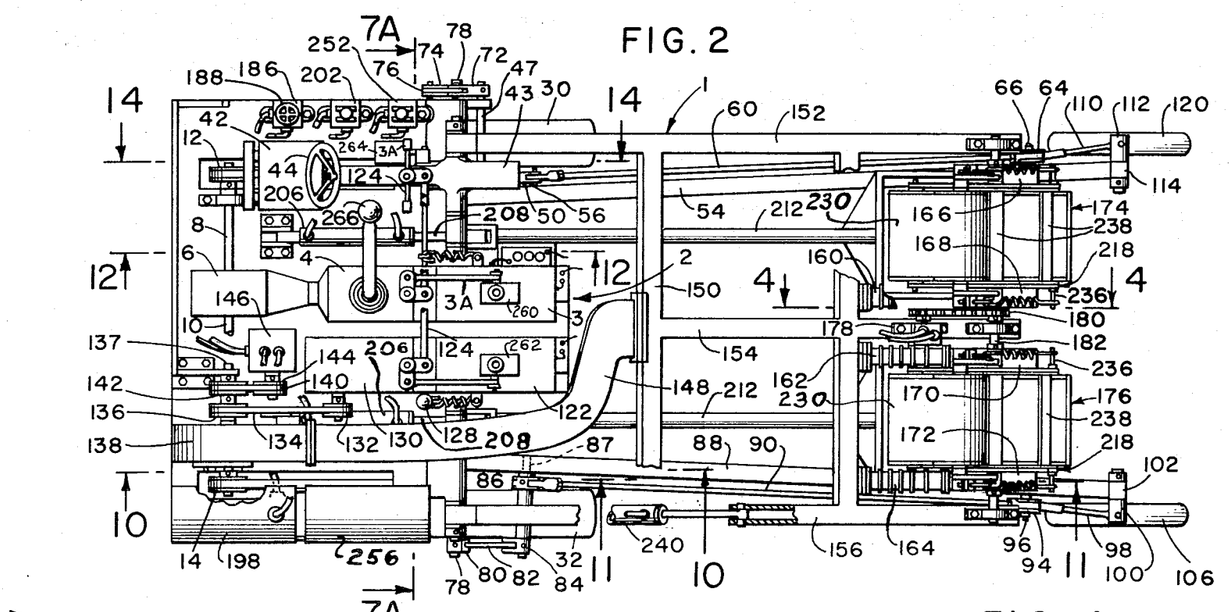
FIG. 2 is a top plan view of the device as shown in FIG. 1 with parts broken away and shown in section to bring out the details of construction.
Figure 3:
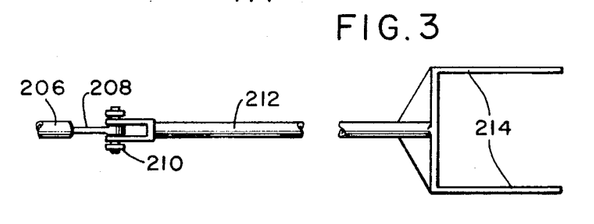
FIG. 3 is a fragmentary view, with parts broken away and shortened of the attitude adjuster for the reel as taken on line 3—3 of FIG. 1, looking in the direction indicated by the arrows.
Figure 4:
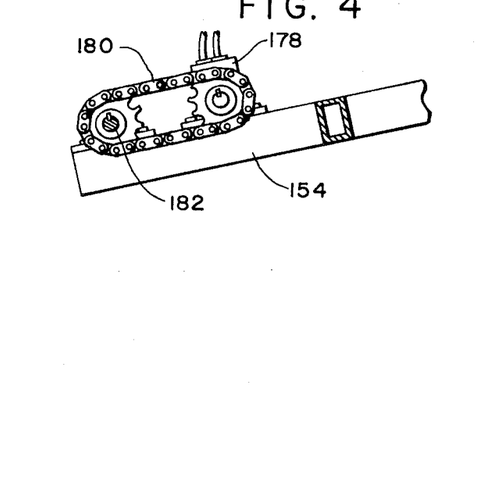
FIG. 4 is a sectional view taken on line 4—4 of FIG. 2, looking in the direction indicated by the arrows.
Figure 8:
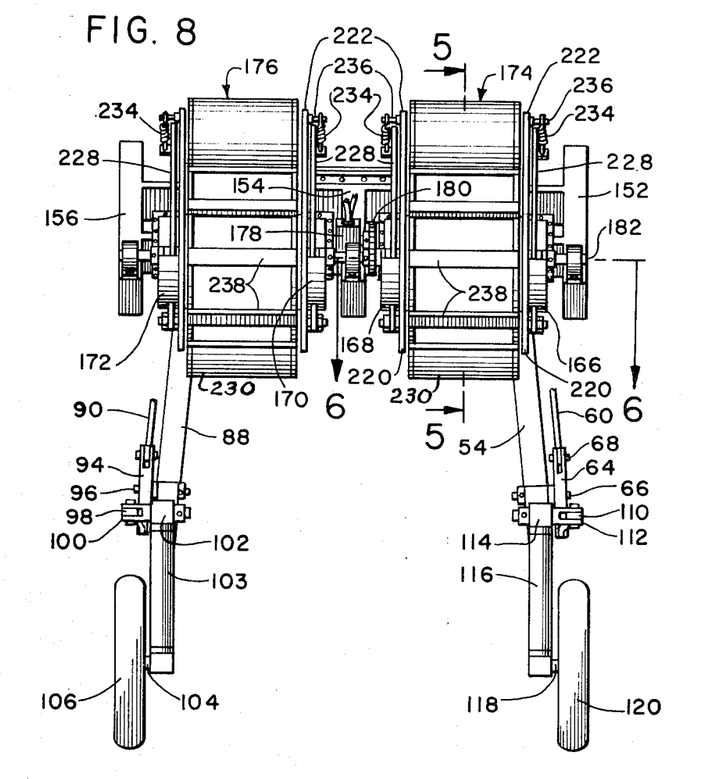
FIG. 8 is a front elevational view of the implement.
Figure 9:
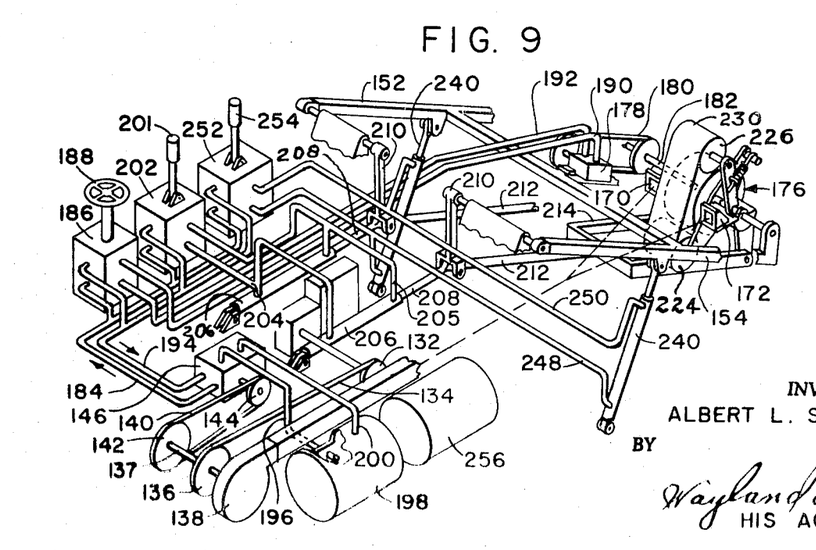
FIG. 9 is a diagrammatic view of the hydraulic system and the mechanism associated therewith.
Figure 10:
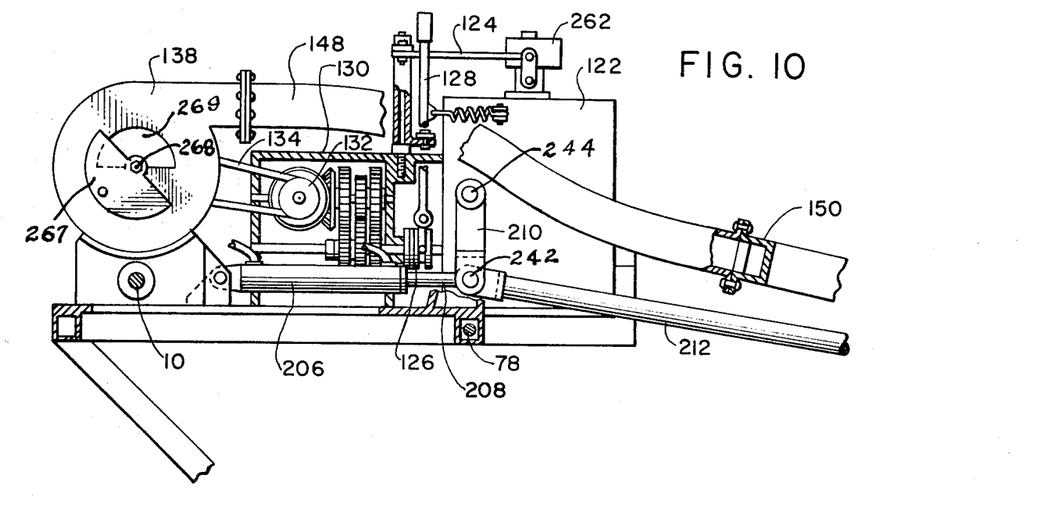
FIG. 10 is a fragmentary, sectional view taken on line 10—10 of FIG. 2, looking in the direction indicated by the arrows, on an enlarged scale, with parts being broken away and parts shown in section of the rear portion of the wheeled frame showing the transmission mechanism, blower and hydraulic pump drive and showing a portion of the air duct from the blower and the mechanism for regulating the attitude of the reel.

The blower fan 138 directs air into a duct 148, which duct connects with hollow tubular frame members 150, 152, 154 and 156. This air is directed from these hollow tubular members into conduits 158, 160 and 162 and 164, which conduits lead to air distribution boxes 166, 168, 170 and 172, respectively, which boxes are stationary and are in sealed contact relation with rotatable reels 174 and 176. The reels 174 and 176 are driven by a variable speed, hydraulic motor, indicated at 178, FIG. 2, which motor drives through a chain and sprocket mechanism 180 to rotate shaft 182, to which shaft the reels 174 and 176 are fixedly secured, as best seen in FIGS. 2, 8 and 9. The hydraulic pump mechanism 146 directs hydraulic fluid through conduit 184 into switching valve 186, which valve is controlled by control wheel 188 and hydraulic fluid is directed outward from switching valve 186 through conduit 190 that leads to hydraulic motor 178. The hydraulic fluid returns from motor 178 through conduit 192 to and through the switching valve 186. The hydraulic fluid returns through conduit 194 to the pump 146 and through discharge pipe 196 into the storage reservoir, in event all of the hydraulic fluid is not recirculated by the motor 178. The storage reservoir, designated by the numeral 198, has a hydraulic outlet line 200 which is connected to the pump 146.

The hydraulic pump 146 also supplies hydraulic fluid, under pressure, through conduit 184 to lever operated control valve 202 with the hydraulic fluid exhausting through conduit 204 to be directed under pressure into the rear ends of cylinders 206 to urge the plungers 208 outward in unison, which will cause the hydraulic fluid to be exhausted out through conduit 205. The movement of the plungers 208 moves pivoted arms 210, which are pivotally connected to rods 212 which have yokes 214 on the forward end thereof, to move arms 216, thereby to change the attitude of the frames 218 on which reels 174 and 176 are mounted. Arms 220 are rigidly connected to the frames 218 and move therewith, as do arms 222. Rollers 224 are mounted between arms 220 for rotation on their respective axes. Rollers 226 are mounted for rotation on an axis between movable arms 228. Flexible, elastomer type belts 230 surround rollers 224 and 226, which belts are in arcuate contact relation with the respective reels 174 and 176.

Figure 5:
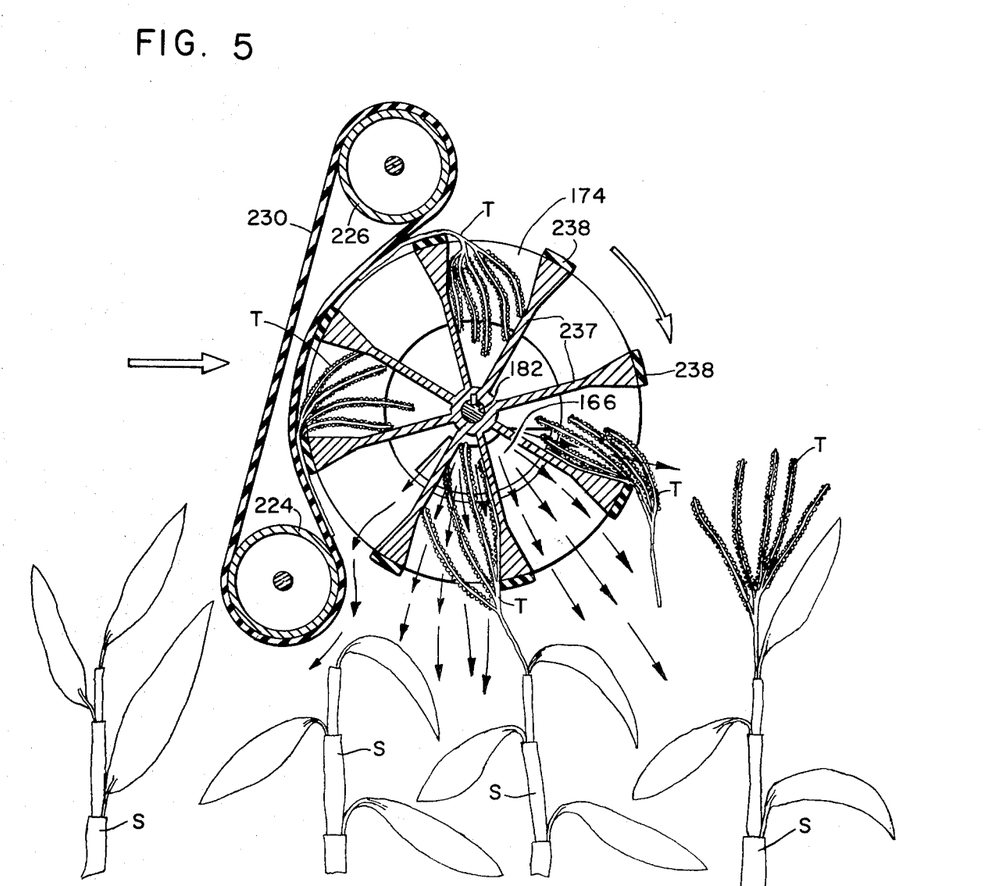
FIG. 5 is an enlarged sectional view taken on line 5—5 of FIG. 8, looking in the direction indicated by the arrows.
Figure 6:
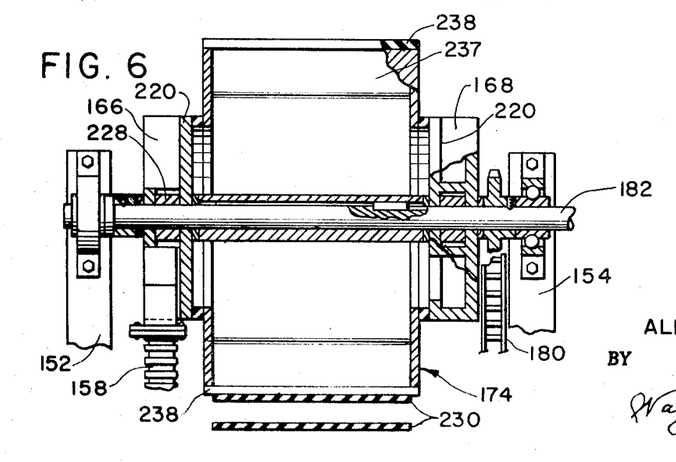
FIG. 6 is a sectional view taken on line 6—6 of FIG. 8, looking in the direction indicated by the arrows.
Figure 7:
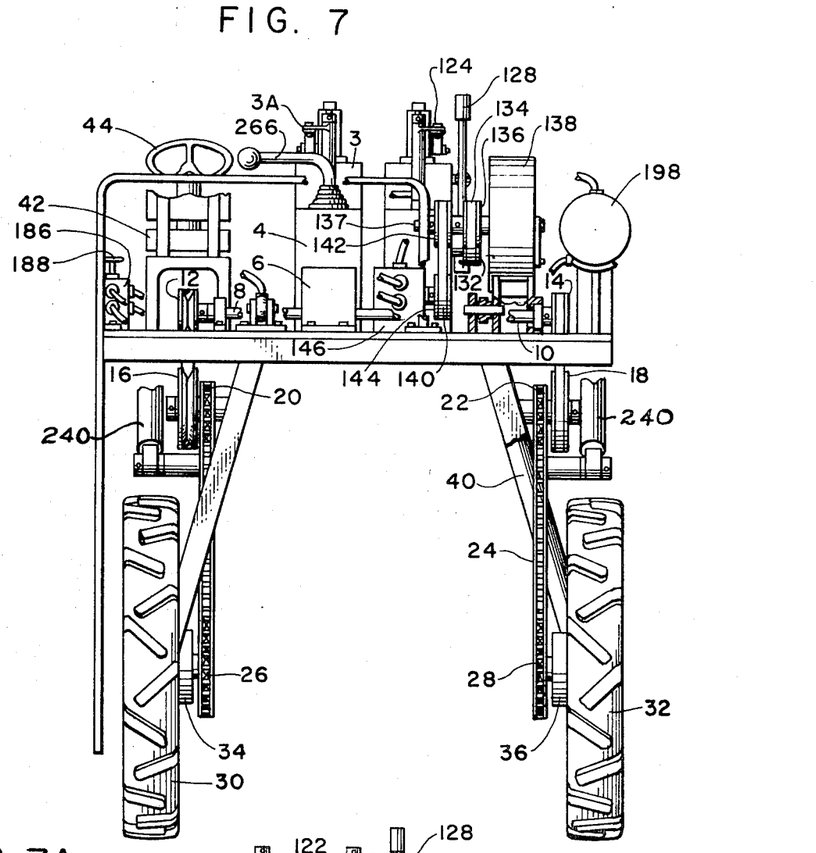
FIG. 7 is a rear elevational view of the wheeled implement with parts broken away, parts removed, and parts shown in section to bring out the details of construction.
Figure 7A:
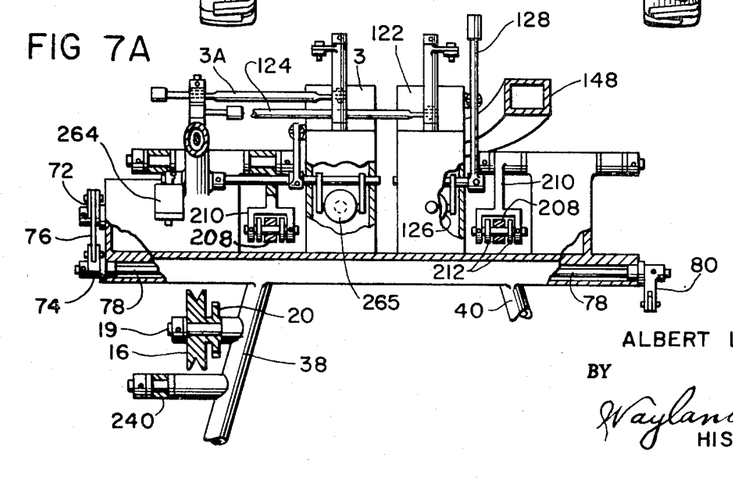
FIG. 7A is a sectional view taken on line 7A—7A of FIG. 2, looking in the direction indicated by the arrows, with parts broken away to show the details of construction.

The arms 228 are pivotally mounted on a shaft 182 and are tensioned by adjustable tension springs 234, which springs are connected to the arms 228 and to pins 236, which pins 236 are rigid with respect to arms 222, therefore, the arms 228 maintain a constant tension on endless, elastomer belts 230 to frictionally engage the tassels T of the corn stalks between a facing 238 and the belt, as will best be seen in FIG. 5. The tassels T will be pulled from the corn stalk, as the respective reels rotate in the direction indicated by the arrow in FIG. 5.

As the mobile, wheeled frame 1 moves over the terrain, a blast of air is directed from blower fan 138 through conduit 148 and through hollow frame 150 and into conduits 158, 160, 162 and 164 into the respective air diversion boxes 166, 168, 170 and 172. With the blower fan 138 directing air into the air diversion boxes and between the radial partitions 237 of the respective reels 174 and 176, the air will blow the leaves of the corn downward to expose the tassels, which, as the mobile, wheeled frame moves forward, will be moved between radial partitions 237 to be engaged between facing 238 and belt 230, as indicated in FIG. 5, to be removed from the stalk, as the respective reels rotate in the direction indicated by the arrow. The tassels will be discharged forwardly of the reels and will be blown from the spaced between the radial partitions at about the horizontal level as indicated in FIG. 5. By manipulation of lever 201 on valve 202, the hydraulic cylinder plunger 208 will shift the lever 220 so that the frames 218, which mount the reels 174 and 176, may be adjusted to the correct attitude to engage the tassels.

Since corn stalks vary in height, the frame members 152 and 156 are raised and lowered by hydraulic cylinders 240, one on each side of the mobile, wheeled frame, which enables the frames 152 and 156 to be raised and lowered with the attitude of the reels 174 and 176 and the belts 230 associated therewith, as well as the air outlets between the radial partitions 237, which will remain in the same relation, due to the parallel mechanism of rod 212 being pivotally connected by a pivot pin 242 at one end and in spaced relation to the pivot 244 at the same end, with the axis of shafts 182 and the pivot 246 on yoke 214 forming a parallelogram. The hydraulic cylinders 240 have conduits 248 and 250 leading thereto from control valve 252, which valve is in common fluid communication with inlet and outlet hydraulic conduits 184 and 194 respectively. A lever 254 is positioned on hydraulic control valve 252 to direct hydraulic fluid into one of the lines 248 or 250 and outward from the other line in a manner well understood in the art of hydraulics, so as to simultaneously actuate cylinders 240 in the desired direction.

Figure 11:
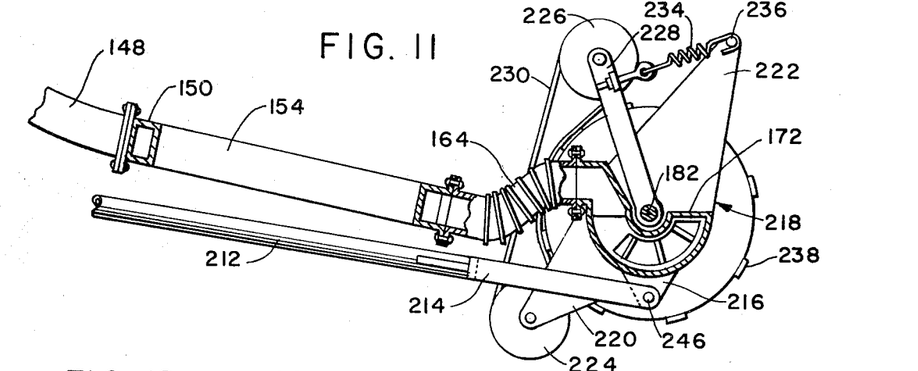
FIG. 11 is a fragmentary, sectional view on an enlarged scale, taken on line 11—11 of FIG. 2, looking in the direction indicated by the arrows, showing the forward portion of the wheeled frame, showing the air duct to the compartmented tassel pulling reel and showing the reel thereon with parts broken away and shown in section.
Figure 12:
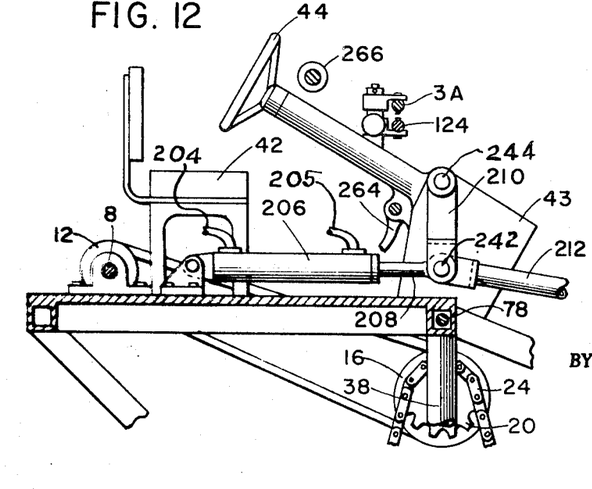
FIG. 12 is a fragmentary, sectional view taken on line 12—12 of FIG. 2, looking in the direction indicated by the arrows, showing the steering mechanism and showing the relationship of the controls to the operator seat.

The hydraulic motor can be accurately controlled to drive wheels 174 and 176 the desired number of rotations per minute so that the tassel T of the corn stalk S can be moved into the compartment between radial partitions 237, with the peripheral speed of the reels 174 and 176 being substantially ground speed of the mobile vehicle. In this manner, the tassels move into the compartments between the partitions 237, and as the reels rotate in the direction indicated by the arrow in FIG. 5, the elastomer facings 238 on the outer end of each of the partitions 237 will cause the shank of the tassel to be gripped between the facing 238 and the endless belt 230, and, as the belt and reel move upward, the corn tassel is disjointed and withdrawn from the respective corn stalks S, as indicated in FIG. 5, and as the reel rotates, the tassels will discharge either by gravity after the partitions 237 move below horizontal, or an air blast will discharge the tassels as it enters between the partitions 237 at a position slightly below the horizontal, or to whatever position desired, depending upon the adjustment of yoke 214 which adjusts the attitude of air diversion boxes 166, 168, 170 and 172. The yoke 214 is actuated by hydraulic cylinders 206 and 208 which are controlled by hydraulic control valve 202 to move the yokes 214 to adjust the attitude of the air diversion boxes, as will best be seen in FIG. 11.

A fuel supply tank 256 is mounted on the mobile, wheeled frame to supply fuel to the internal combustion engines 3 and 122 in a conventional manner. A source of electrical power, such as a battery 258, is provided on the mobile, wheeled frame to supply the necessary electrical energy for use thereon, such as the ignition of internal combustion engines, and the lighting, if desired. The internal combustion engine 3 has a carburetor 260 thereon, and the internal combustion engine 122 has a carburetor 262 thereon, which provide the proper carburetion for the internal combustion engines. The throttles 3A and 124, respectively, connect with manual controls, to control the throttling of these internal combustion engines in the manner well understood in the art of engines.

A clutch pedal 264 is provided, forward of the drivers seat 42, to actuate a conventional clutch 265 intermediate internal combustion engine 3 and transmission 4 to enable the shifting of gears by gear shift lever 266, in a manner well understood in the art of transmissions.

By operating clutch lever 128, clutch 126 may be disengaged to permit the blower fan 138 and the hydraulic pump 146 to remain static until the engine attains the proper speed, before the clutch is engaged.

In view of the height of the mobile wheeled frame, it is desirable to have a ladder 270 attached thereto so the operator may ascend to the control position and descend therefrom, when desired.

The fan 138 has a rotatable valve 267 mounted thereon, which valve is rotatable about the axis 268 to control the air into inlet opening 269 of the fan 138, which directs the air into conduits 148, 150, 152, 154 and 156 and thence into conduits 158, 160, 162 and 164, so as to regulate the volume of air passing into air distributor boxes 166, 168, 170 and 172 so that the air blast which blows the tassels outward and the leaves downward may be accurately controlled.

What is claimed is:

1. A machine for pulling tassels from cornstalks, which comprises:
   a. a wheeled frame,
   b. a prime mover mounted on said wheeled frame,
      1. said prime mover being connected in driving relation with said wheeled frame,
   c. control means mounted on said prime mover and connected thereto to control the speed of the wheeled frame across the terrain,
   d. a reel mounting frame mounted on said wheeled frame near the forward end thereof,
   e. a shaft mounted on said reel mounting frame for rotation of said reel about the axis thereof,
   f. a reel mounted on said shaft for rotation about the axis thereof,
   g. a second prime mover mounted on said wheeled frame and being connected in driving relation with said reel,
      1. said reel having longitudinal partitions formed therein to form tassel of a cornstalk,
      2. each partition having 2 facing thereon to engage a portion of a tassel of a cornstalk,
   h. rollers rotatably mounted on a frame a spaced distance outward from said reel with the axes thereof being parallel to the axis of said reel,
      1. an endless, flexible belt surrounding said rollers and being in arcuate engagement with the facings of certain of said particions on said reel for a portion of the circumference thereof,
      2. said endless, flexible belt adapted to engage a tassel between the belt and the facing of one of said partitions to hold said tassel in binding engagement with one of said facings on said reel while said reel moves through an arcuate distance to pull the tassel from the cornstalk,
   i. adjustment means on said wheeled frame to adjust the height of said reel with respect to the terrain,
   j. a blower fan connected in driven relation with said second primer mover, and
      1. conduits leading from said blower fan to certain of said cavities to blow the leaves of corn downward to prevent engagement of the leaves of the cornstalk and to expose the tassel prior to engagement thereof with the facings of the reel and the endless flexible belt.

2. A machine for pulling tassels from cornstalks, as defined in claim 1; wherein
   a. said facing on each said partition is of elastomer material.

3. A machine for pulling tassels from cornstalks, as defined in claim 1; wherein
   a. said endless, flexible belt, surrounding said rollers and being in arcuate engagement with the facings of certain of said partitions on said reel, is an elastomer belt.

4. A machine for pulling tassels from cornstalks, as defined in claim 1; wherein
   a. said portion of said wheeled frame mounting said shaft that supports said reel being a pair of frame members pivoted near the rear end of said wheeled frame for movement about a horizontal axis,
   b. mechanical means interconnecting wheeled frame and said pivoted frame members to raise and lower said frame mounting said shaft, and
      1. control means connected to said mechanical means to control said mechanical means to raise or lower said frame.

5. A machine for pulling tassels from cornstalks, as defined in claim 1; wherein
   a. said wheeled frame being a pair of forwardly extending, spaced apart frame members and being open therebetween to receive cornstalks of any height,
   b. a steerable wheel mounted on each forwardly extending frame member, and
   c. a steering mechanism connected to each steerable wheel and extending rearwardly and being connected to a common steering mechanism for steering said wheeled frame over the terrain.

6. A machine for pulling tassels from corn stalks, as defined in claim 1; wherein
   a. said power means for driving said reel includes a second prime mover mounted on said wheeled frame,
   b. said prime mover being connected in driving relation with a hydraulic pump, and
   c. said reel being connected in driven relation with a hydraulic power means to rotate said reel.

7. An attachment for a mobile powered wheeled frame for pulling tassels from corn stalks, which attachment comprises:
   a. a pair of forwardly extending arms pivotally mounted near their rear ends to a mobile wheeled frame,
   b. a source of power mounted on said wheeled frame,
   c. a shaft mounted near the forward end of said arms, which shaft is connected in driven relation with said source of power,
      1. a reel frame mounted on said shaft,
      2. a reel mounted on said shaft for rotation about the axis thereof,
   d. said reel having a plurality of partitions therein to form tassel receiving cavities,
      1. each partition having a facing thereon to engage a portion of a tassel of a corn stalk,
   e. pairs of arms extending outwardly from said frame mounting said reel, each pair of arms to receive a shaft,
      1. a shaft mounted on on each said pair of arms,
      2. rollers mounted on said shafts for rotation about the axis thereof parallel to the axis of said reel,
      3. an endless, flexible belt surrounding said rollers and being in arcuate engagement with certain of said facings on said partitions, so upon rotation of said reel, a portion of said corn tassel will be engages between the flexible belt and one of said facings of said partition to hold the tassel in binding engagement therewith while the reel moves through an arcuate distance to pull the tassel from the corn stalk,
   f. hydraulic cylinder means interconnecting said wheeled frame and said forwardly extending arms to move said arms to adjust the height of said reel with respect to the terrain,
   g. a blower fan connected in driven relation with said source of power, and
      1. conduits leading from said blower fan to certain of said cavities to blow the leaves of corn downward to prevent engagement of the leaves of the cornstalk and to expose the tassel prior to the engagement thereof with the facings of the reel and the endless flexible belt.

8. A machine for pulling tassels from cornstalks, as defined in claim 7; wherein
   a. said facing on each said partition is of elastomer material.

9. A machine for pulling tassels from cornstalks, as defined in claim 7; wherein
   a. said endless, flexible belt, surrounding said rollers and being in arcuate engagement with the facings of certain of said partitions on said reel, is an elastomer belt.

10. A machine for pulling tassels from cornstalks, as defined in claim 1; wherein
    a. adjustment means is associated with said reel for adjusting the position of the conduits from the blower fan, which directs air into the cavities of the reel to blow the leaves of the cornstalks downward.

11. A machine for pulling tassels from cornstalks, as defined in claim 1; wherein
    a. a pair of arcuately movable arms are mounted on said reel shaft,
    b. a roller shaft mounted on said pair of arcuately movable arms a spaced distance outwardly from the axis of said reel and being parallel thereto,
    c. one of said rollers being mounted on said roller shaft and being rotatable about the axis thereof, and
    d. tension means connected to said reel mounting frame and to said arcuately movable arms to urge said roller into constant tension with said endless flexible belt.

12. An attachment for a mobile wheeled frame for pulling heads from grain, which attachment comprises;
    a. a source of power mounted on said wheeled frame,
    b. a shaft mounted on said wheeled frame transversely thereof near the forward end and being connected in driven relation with said source of power,
       1. a reel mounted on said shaft for rotation about the axis thereof by said source of power,
       2. a reel frame mounted on said shaft and partially enclosing said reel,
    c. said reel having a plurality of partitions therein to form head receiving cavities,
       1. each said partition having a facing thereon in position to engage a portion of the head of a grain stalk,
    d. two pairs of arcuately spaced arms on said reel frame, which arms extend outwardly therefrom,
       1. a transverse shaft mounted on each said pair of arms,
       2. a roller mounted on each said transverse shaft and having the periphery thereof spaced outward from the outer diameter of said reel,
       3. an endless, flexible belt surrounding said rollers and being in arcuate engagement with certain of said facings on said partitions, so upon rotation of said reel, a portion of the head of the grain stalk will be engaged between the flexible belt and one of said facings on said partitions to hold the head in binding engagement therewith while the reel moves through an arcuate distance to pull the head from the grain stalk, which head is deposited in one of said cavities,
    e. adjustment means on said wheeled frame and interconnected with said reel to adjust height of said reel with respect to the terrain,
    f. a blower fan connected in driven relation with said source of power, and 1. conduits leading from said blower fan to certain of said cavities to blow the leaves of corn downward to prevent engagement of the leaves of the corn stalk and to expose the tassel prior to the engagement thereof with the facings of the reel and the endless flexible belt.

13. An attachment for a mobile wheeled frame for pulling heads from stalks of grain, as defined in claim 12; wherein
   a. said facing on each said partition is of elastomer material.

14. An attachment for a mobile, wheeled frame for pulling heads from stalks of grain, as defined in claim 12; wherein
   a. said endless, flexible belt, which surrounds said rollers, and is in arcuate engagement with the facings of certain of said partitions on said reel, is an elastomer belt.

15. A machine for pulling tassels from corn stalks, as defined in claim 7; wherein
   a. rods pivotally connect to a pair of said arms extending outwardly from said frame mounting said reel,
      1. said rods extending along said forwardly extending arms to a position in spaced relation to the pivot of said arms,
      2. a lever pivotally connected near the end of each said rod and said pivot of said forwardly extending arms,
      3. the pivots of said rods and of said arms being spaced apart a distance substantially equal to the spacing from the axis of said reel frame to said pivot on said last mentioned pair of reel frame arms extending outwardly from said frame mounting said reel so as to substantially form a parallelogram,
   b. a fluid actuated cylinder pivotally connected to said levers for moving said rods so as to adjust the attitude of said reel frame on said forwardly extending arms.

16. A machine for pulling tassels from corn stalks, as defined in claim 15; wherein
   a. said rods and said forwardly extending frame which form a parallelogram maintain said reel in the same adjusted attitude while raising and lowering said forwardly extending arms.

* * * * *